March 8, 1932.   R. F. CUNNINGHAM   1,848,514
TAIL LIGHT
Filed Dec. 4, 1930
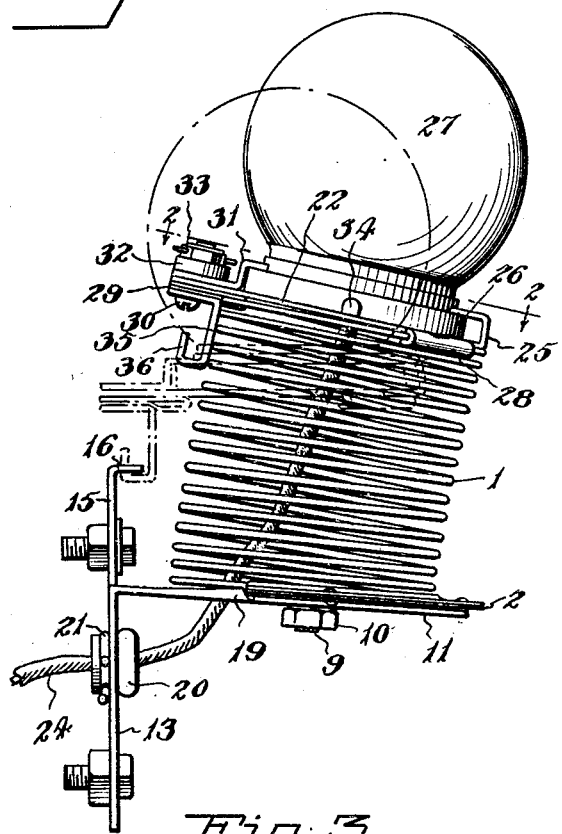
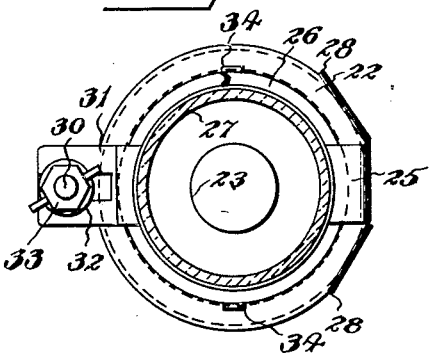
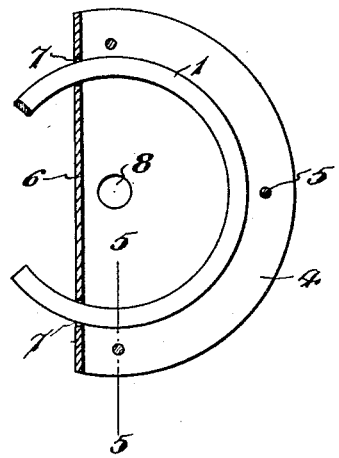
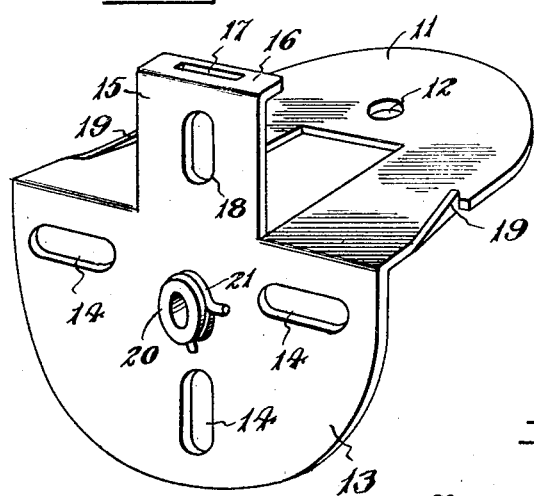
Inventor
R. F. Cunningham
By Lacey & Lacey, Attorneys Patented Mar. 8, 1932

1,848,514

UNITED STATES PATENT OFFICE

RICHARD F. CUNNINGHAM, OF HALIFAX, NOVA SCOTIA, CANADA

TAIL LIGHT

Application filed December 4, 1930. Serial No. 500,075.

The present invention has for its object the provision of a novel mounting for the tail light of a motor vehicle whereby the light may be held steady or may be permitted to vibrate and thereby more widely disseminate the rays and consequently more effectually serve its purpose of a warning. The invention is illustrated in the accompanying drawings and will be hereinafter first fully described and then more particularly defined in the appended claims.

In the drawings:

Figure 1 is a side elevation of a tail light embodying the invention.

Fig. 2 is a view, partly in plan and partly in horizontal section, on the line 2—2 of Fig. 1, Fig. 3 is a detail perspective view of the supporting bracket, Fig. 4 is a sectional plan view through the clamping plate which secures the lower end of the spring, and Fig. 5 is a detail section on the line 5—5 of Fig. 4.

In carrying out the present invention, there is provided a flat spiral spring 1, the lower end of which is disposed within a clamp consisting of a sheet metal plate doubled or folded upon itself, as shown at 2 in Fig. 1, whereby upper and lower plies 3 and 4 are produced to pass above and below the lowest coil of the spring and the spring will fit closely between the plies and be secured by rivets or similar fastenings 5 inserted through the marginal portions of the plies 3 and 4. Within the fold or crease 6 of the clamping plate are openings 7 through which the coil of the spring passes so that the spring will be very securely held and will not readily work out of place. This clamping plate may be secured directly to the fender or wheel guard of the automobile and for this purpose an opening 8 is formed through the two plies of the plate to receive a bolt 9 equipped with a nut 10, as will be understood. It will generally, however, be found more desirable to employ a bracket, such as shown in Figs. 1 and 3, upon which the clamping plate will be secured and which, in turn, will be secured to a convenient part of the vehicle body, the chassis or some other relatively fixed part of the vehicle. This bracket may be conveniently stamped from a single sheet metal blank and presents a base portion 11 having an opening 12 therethrough to receive the bolt 9 whereby the spring-securing clamp may be fastened upon the bracket. The base portion is disposed at a right angle to a back member 13 which is provided with slots 14 whereby the bracket may be secured readily to some fixed part, securing bolts being inserted through such of the slots 14 as will most readily accommodate the bracket to the part to which it is to be secured. A tongue 15 is struck up from the base plate 11 and the free end of the tongue is bent over to define a lip 16, as shown, said lip having a slot 17 extending longitudinally thereof and a slot 18 corresponding to the slots 14 being formed through the tongue, as clearly shown in Fig. 3. At the side edges of the base plate 11 are upturned stop flanges or lugs 19 against which the clamping plate may abut so that the clamping plate will be easily placed in proper position on the base plate with the opening 8 in the clamp properly alining with the opening 12 in the plate. The back plate 13 is provided with an opening disposed preferably at its center to receive a bushing 20 of insulation which bushing will be retained in place by a key 21 in an obvious manner.

The upper end of the spring 1 is disposed against the under side of a cap plate 22 having a central opening 23 therethrough to receive the socket of an incandescent bulb, a conducting cable 24 for supplying current to the bulb being passed through the bushing 20 and extended up through the spring to the socket so as to furnish a suitable connection with the electric plant of the vehicle. At the rear side of the margin of the plate 22 is an upturned tongue or lug 25 under which is engaged an annular flange 26 at the lower end of a globe 27 within which the incandescent bulb is housed. At the sides of the tongue or lug 25 are smaller lugs 28 which are engaged around and under the uppermost coil of the spring so that the plate will be held in proper engagement with the spring, as will be understood. At the front of the cap plate, a clamp 29 is engaged around the top coil of the spring and this clamp is secured to the cap plate by a bolt or screw 30 inserted therethrough. On the upper side of the cap plate, a bracket 31 is secured to the plate by the same bolt or screw 30 and this bracket has its forward end turned upwardly and then rearwardly to engage over the flange 26 whereby the globe will be firmly held to the plate, it being understood that a washer 32 and a nut 33 are engaged over the bolt or screw above the bracket, as clearly shown in Fig. 1. To aid in properly positioning the globe upon the cap plate, guide lugs 34 are formed upon the plate at diametrically opposite points, as shown in Fig. 2, to engage against the opposite sides of the globe flange when the globe is brought into position over the plate.

The bolt or screw 30 is inserted upwardly through the clamp 29 and the other described parts and below the clamp the head of the bolt supports a hook 35, the bill 36 of which is adapted to be engaged upwardly through the slot 17, as indicated by the dotted lines in Fig. 1, so that the spring will be held compressed and will move the hook upwardly into binding engagement with the lip 16. The lamp will thus be held steady and the light will be distributed over a fixed area relative to the vehicle but if the hook be disengaged from the lip 16, the spring will be permitted to expand and will assume the position shown in full lines in Fig. 1, so that the lamp will throw the light more to the rear than when it is held relatively fixed. When the spring is free as thus described, the vibrations due to travel over a rough road will be absorbed so that rupture of the lamp filament will be avoided and when the parts are thus arranged a stoppage of the vehicle will cause the lamp to oscillate or shake so that the light will be more widely disseminated and will more effectually attract the attention of passing motorists and pedestrians.

The device is very simple and may be readily mounted upon any vehicle. The spring will be securely held so as to support the lamp and breakage of the lamp will be minimized by reason of the spring mounting thereof. The globe is preferably spherical and this form has the effect of a large lamp while employing a comparatively small bulb. Inasmuch as a spherical globe is employed, it may be entirely of glass so that the light will be emitted in all directions and if the globe be partly colored, the rear portion thereof may serve as a signal while the front portion may be left clear and will thereupon display the light along the side of the vehicle to illuminate the same and not only aid the chauffeur but will also benefit approaching motorists who will be enabled to more accurately judge their distance in passing the vehicle equipped with the light of the present invention.

Having thus described the invention, I claim:

1. A tail light comprising a bracket including a base plate and a back plate disposed at a right angle to the base plate, an upstanding tongue on the bracket at the back thereof, a helical spring, means for securing the spring on the base plate of the bracket, a cap plate secured on the upper end of the spring, a globe carried by the cap plate, and a hook connected to the cap plate and adapted to engage the upstanding tongue whereby to hold the spring in closed position.

2. A tail light comprising a bracket consisting of a base plate, a back plate and a tongue rising from the back plate and provided at its upper end with a lip having a longitudinally extending slot therein, stop lugs at the side edges of the base plate, a clamp secured upon the base plate and abutting said stop lugs, a spring having its lower end secured in the clamp, a cap plate secured upon the upper end of the spring, a globe carried by the cap plate, means for illuminating the globe, and a hook connected to the cap plate and adapted to engage the slot in the lip of the upstanding tongue.

3. A tail light comprising a bracket including a base plate and a back plate, means for securing the back plate to a relatively fixed support, stop lugs on the side edges of the base plate, a clamp secured on the base plate and abutting said stop lugs, a spring secured in said clamp, a cap plate mounted on the upper end of the spring, a globe carried by said cap plate, and means for illuminating the globe.

4. A tail light comprising a helical spring, means for securing the lower end of the spring upon a vehicle, a cap plate upon the upper end of the spring provided with downwardly extending inturned lugs engaging around the top coil of the spring, a clamp engaged around the top coil of the spring, means for securing said clamp to the cap plate, a globe resting on the cap plate, means for retaining the globe on the cap plate, and means for illuminating the globe.

5. A tail light comprising a helical spring, means for securing the lower end of the spring upon a vehicle, a cap plate resting on the upper end of the spring, means for retaining the cap plate on the spring, upwardly extending overhanging keeper elements on the cap plate, a globe having an annular base flange engaged under said keeper elements, and means for illuminating the globe.

In testimony whereof I affix my signature.

RICHARD F. CUNNINGHAM. [L. S.]